US011846334B2

United States Patent
Cavagna et al.

(10) Patent No.: US 11,846,334 B2
(45) Date of Patent: Dec. 19, 2023

(54) BRAKING BAND OF A DISC FOR DISC BRAKE OF VENTILATED TYPE

(71) Applicant: BREMBO S.p.A., Curno (IT)

(72) Inventors: Lorenzo Cavagna, Curno (IT); Nino Ronchi, Curno (IT)

(73) Assignee: Brembo S.p.A., Bergamo (IT)

( * ) Notice: Subject to any disclaimer, the term of this patent is extended or adjusted under 35 U.S.C. 154(b) by 146 days.

(21) Appl. No.: 17/415,106

(22) PCT Filed: Dec. 5, 2019

(86) PCT No.: PCT/IB2019/060481
§ 371 (c)(1),
(2) Date: Jun. 17, 2021

(87) PCT Pub. No.: WO2020/128705
PCT Pub. Date: Jun. 25, 2020

(65) Prior Publication Data
US 2022/0042564 A1 Feb. 10, 2022

(30) Foreign Application Priority Data

Dec. 18, 2018 (IT) .......................... 102018000020128

(51) Int. Cl.
*F16D 65/12* (2006.01)
*F16D 65/00* (2006.01)
*F16D 65/02* (2006.01)

(52) U.S. Cl.
CPC ....... *F16D 65/128* (2013.01); *F16D 65/0006* (2013.01); *F16D 2065/1328* (2013.01)

(58) Field of Classification Search
CPC ....... F16D 65/0006; F16D 65/123–128; F16D 2065/1328

(Continued)

(56) References Cited

U.S. PATENT DOCUMENTS 3,983,973 A 10/1976 Zboralski et al.
4,523,666 A 6/1985 Murray
(Continued)

FOREIGN PATENT DOCUMENTS

DE 4323782 A1 1/1994
DE 202015102580 U1 9/2015
(Continued)

OTHER PUBLICATIONS

European Patent Office, International Search Report with Written Opinion, issued in PCT/IB2019/060481, dated Feb. 3, 2020, 11 pages, European Patent Office, Rijswijk, Netherlands.

*Primary Examiner* — Christopher P Schwartz
(74) *Attorney, Agent, or Firm* — Marshall & Melhorn, LLC

(57) ABSTRACT

A braking band has a first plate and an opposite second plate having inner surfaces delimiting a gap, outer surfaces forming braking surfaces, and a plate body. The plates are joined by connecting elements. At least one plate has at least one ridge projecting into the gap without reaching the opposite plate. The ridge extends from a first connecting element to an adjacent connecting element, and along a circumferential direction, the connecting elements and the ridge being groupable in modules circumferentially distributed along the gap. A first module has three adjacent connecting elements connected by two ridges projecting from the first plate into the gap without reaching the second plate. A second module has three adjacent connecting elements connected by two ridges projecting from the second plate into the gap without reaching the first plate. A third module has at least one connecting element free of ridge connection.

10 Claims, 5 Drawing Sheets

(58) Field of Classification Search
USPC .............. 188/18 A, 218 XL, 264 A, 264 AA
See application file for complete search history.

(56) References Cited

U.S. PATENT DOCUMENTS

| | | | |
|---|---|---|---|
| 4,865,167 A | 9/1989 | Giorgetti et al. | |
| 5,004,078 A | 4/1991 | Oono et al. | |
| 5,427,212 A * | 6/1995 | Shimazu | B60T 5/00 |
| | | | 188/71.6 |
| 5,526,905 A | 6/1996 | Shimazu et al. | |
| 5,542,503 A | 8/1996 | Dunn et al. | |
| 5,706,915 A | 1/1998 | Shimazu et al. | |
| 6,131,707 A | 10/2000 | Buechel et al. | |
| 6,145,636 A | 11/2000 | Ikari et al. | |
| 6,216,827 B1 * | 4/2001 | Ichiba | F16D 65/12 |
| | | | 188/218 XL |
| 6,241,053 B1 | 6/2001 | Tahara et al. | |
| 6,325,185 B1 | 12/2001 | Doi et al. | |
| 6,367,599 B2 | 4/2002 | Kobayashi | |
| 7,066,306 B2 | 6/2006 | Gavin | |
| 7,267,210 B2 | 9/2007 | Cornolti et al. | |
| 7,690,484 B2 | 4/2010 | Oberti et al. | |
| 7,703,583 B2 | 4/2010 | Oberti et al. | |
| 8,499,904 B2 | 8/2013 | Biondo et al. | |
| 8,668,058 B2 * | 3/2014 | Lu | F16D 65/847 |
| | | | 188/218 XL |
| 9,022,182 B2 | 5/2015 | Cavagna et al. | |
| 9,175,733 B2 | 11/2015 | Chern et al. | |
| 9,371,875 B2 | 6/2016 | Noriega Gonzalez et al. | |
| 9,841,073 B2 | 12/2017 | Noriega Gonzalez et al. | |
| 10,156,275 B2 | 12/2018 | Carminati et al. | |
| 10,738,847 B2 | 8/2020 | Biondo et al. | |
| 11,519,473 B2 * | 12/2022 | Paggi | F16D 65/128 |
| 2004/0118644 A1 | 6/2004 | Oberti et al. | |
| 2008/0067018 A1 | 3/2008 | Smith et al. | |
| 2009/0000884 A1 | 1/2009 | Layton et al. | |
| 2009/0035598 A1 | 2/2009 | Hanna et al. | |
| 2009/0057077 A1 * | 3/2009 | Mears | F16D 65/128 |
| | | | 188/218 XL |
| 2010/0122880 A1 | 5/2010 | Hanna et al. | |
| 2020/0300318 A1 | 9/2020 | Biondo et al. | |

FOREIGN PATENT DOCUMENTS

| | | |
|---|---|---|
| DE | 102014222648 A1 | 5/2016 |
| EP | 0318687 A2 | 6/1989 |
| EP | 0318687 B1 | 4/1992 |
| EP | 1373751 B1 | 2/2007 |
| FR | 2728945 A1 | 7/1996 |
| GB | 2286438 A | 8/1995 |
| IT | MI940247 A1 | 8/1995 |
| JP | H06129452 A | 5/1994 |
| JP | H10318302 A | 12/1998 |
| JP | 3170763 B2 | 5/2001 |
| WO | WO/02064992 A2 | 8/2002 |
| WO | WO/2004102028 A1 | 11/2004 |
| WO | WO/2006105131 A2 | 10/2006 |
| WO | WO/2008136032 A2 | 11/2008 |
| WO | WO/2011058594 A1 | 5/2011 |
| WO | WO/2016020820 A1 | 2/2016 |
| WO | WO/2017/153902 A1 | 9/2017 |
| WO | WO/2017153873 A1 | 9/2017 |

* cited by examiner

BRAKING BAND OF A DISC FOR DISC BRAKE OF VENTILATED TYPE

CROSS-REFERENCE TO RELATED APPLICATIONS

This application is a National Phase Application of PCT International Application No. PCT/IB2019/060481, having an International Filing Date of Dec. 5, 2019 which claims priority to Italian Application No. 102018000020128 filed Dec. 18, 2018, each of which is hereby incorporated by reference in its entirety.

FIELD OF THE INVENTION

The present invention relates to a braking band and to a ventilated disc for disc brake, particularly, but not exclusively, for applications in the automotive field.

BACKGROUND ART

In a disc brake, the brake caliper is generally arranged straddling the outer peripheral margin of a brake disc, adapted to rotate about a rotation axis (A-A) defining an axial direction (X-X). In a brake disc, a radial direction (R-R) is further defined, substantially orthogonal to said axial direction (X-X), and a circumferential direction (C-C), orthogonal to said axial direction (X-X), to said radial direction (R-R) and locally a tangential direction (T-T) punctually orthogonal to said axial direction (X-X) and a radial direction (R-R).

As known, discs for disc brake comprise a bell adapted to associate the disc with a hub of a vehicle, from which an annular portion, named a braking band, extends, which is intended to cooperate with pads of a caliper. In the case of discs of ventilated type, the braking band is made by means of two plates facing and connected to each other by means of connecting elements, respectively, e.g. in the shape of pillars or fins. The outer surfaces of the two plates define opposite braking surfaces, while the inner surfaces, together with the pillars or fins, delimit ventilation channels for cooling the disc, crossed by airflows according to a centrifugal direction during the rotary motion of the disc itself.

Said braking band is intended to cooperate with disc brake calipers adapted to apply a braking action on the vehicle by applying, by means of pads, friction on opposite surfaces of the two plates, named braking surfaces.

It is known that during the operation of the brakes, the friction between the pads of the brake calipers and the braking surfaces of the braking band generates a high amount of heat which requires disposal.

The heat generated indeed causes several undesired phenomena, such as, for example, the deformation of the braking band, the formation of cracks on the braking surfaces or localized transformations of state of the material forming the braking band, which in turn result in the deterioration of the braking band itself.

In applications on high-performance motor vehicles with an increased braking efficiency, in particular, there is much energy to be disposed of and the aforesaid need to dispose of the heat generated during the braking action is even more felt.

Ventilated discs of the type mentioned above have undergone a continuous evolution over time, in particular concerning the number and shape of the so-called ventilation channels, thus defining the gap formed by the two plates axially facing each other.

Among said known ventilated discs, the so-called "pillar discs" have shown to be particularly efficient in terms of heat disposal performance, i.e. cooling in which discs the ventilation channels are limited internally by particular column connecting elements, having limited comparable radial and circumferential extension with respect to the axial extension thereof, defined as "pillars" which transversely connect the two plates.

For example, ventilated "pillar discs" are known from EP 1 373 751 B1, in which the pillars geometrically are arranged along three concentric circumferences which are coaxial to the disc and have a different radius, to form three "lines"; if cross-sectioned on a plane parallel to the two plates and median with respect thereto, the pillars have different types of cross-sections (e.g. "rhomboidal" cross-section pillars in the intermediate and outer lines; "drop-shaped" pillars in the inner line).

Other ventilated discs with "pillar" structures are disclosed, for example, in WO 2004/102028 and in U.S. Pat. No. 5,542,503.

The so-called "fin" or "wing" discs are known among ventilated discs, in which the ventilation channels are limited internally by particular connecting elements elongated along a prevailing direction, e.g. directed according to a direction parallel to the radial direction (R-R), or spiral-like which transversely connect the two plates. Said fins extending prevalently in a substantially radial direction define actual aerodynamic surfaces for guiding the cooling air through the gap.

It is also known that the braking action provided by the pads against the braking surfaces of the disc generates heat, consequently an increase of temperature of the disc to the extent of making the disc itself incandescent in the case of particularly demanding performance. The disc is deformed and the contact between the pads and the braking surfaces deteriorates due to the increased temperature reached by the disc during the braking. Furthermore, the friction material of the pads undergoes a kind of vitrification and pollution by the disc material.

It has further been found that the higher temperature is reached at a middle annular portion of the braking surfaces, i.e. at a middle annular portion of the outer surfaces of the respective plates. Such a zone is easily subject to the formation of cracks over the course of the life of the disc.

To obviate the above-disclosed drawbacks, the need in the field is particularly felt, on the one hand, to increase the efficiency of the dispersion of the heat generated by the braking so as to contain the temperatures reached by the disc during and following the braking, and the need on the other hand to increase the mechanical resistance of these middle portions of the braking band.

Solutions are disclosed in WO 2004/102028 and also in WO 2002/064992, U.S. Pat. Nos. 7,066,306, 7,267,210, US 2006 0243546, US 2004 0124047, U.S. Pat. Nos. 6,367,599, 5,542,503 and in U.S. Pat. No. 4,865,167. Although satisfactory from various points of view, these known solutions do not allow a compromise to be reached between the desired mechanical resistance in the middle annular zone of the braking band and the contrasting need to maximize, in the same zone, the airflow capable of removing the significant localized increase of temperature caused by the braking action.

However, it is worth noting that ventilated discs of the type mentioned do not in themselves provide a solution to a further problem which may affect the disc brakes, in particular, disc brakes with ventilated discs, arising simultaneously to the problem mentioned above and which is to be resolved at the same time, such problem being briefly described hereinbelow.

As known, during the operation of the brakes, the disc and the braking bands, in particular, may mechanically vibrate at various frequencies correlated at various natural vibration modes of the disc itself. Such disc vibrations may result, for example, from resonances triggered by vibrations of objects, mechanically coupled to the disc, which are biased in the step of braking, should the vibration frequencies of such objects be coincident with or sufficiently close to the natural vibration frequencies of the disc.

It is also known that the aforesaid vibrations cause an audible noise, in particular in the form of annoying squeals when the resonance frequencies are in the audible range (e.g. between 2 and 9 kHz, with subsequent more or less shrill squeals).

Accordingly, the need arises to devise solutions for reducing or eliminating such squeals by means of construction contrivances which "shift" the vibration frequencies of the disc to different values from the energized ones and, above all, which allow decoupling the natural vibration modes which most affect this phenomenon, such as, for example, the so-called "tangential" vibration modes at which the braking band oscillates about the bell (as shown, for example, in FIGS. 5 and 6, which show two modes of vibration at substantially identical or very similar frequencies).

Discs with different structures from the aforesaid "pillar" structures are known in an attempt to solve these problems.

For example, IT 1 273 754 has braking bands with projections protruding into the inner part of the plates, towards the gap between the two plates, in particular positions and with masses which were specifically identified in order to reduce the arising vibrations and the subsequent noise.

Other ventilated discs with structures adapted to reduce annoying vibrating phenomena are known for example, from U.S. Pat. No. 4,523,666.

Document U.S. Pat. No. 3,983,973 by Knorr-Bremse GmbH shows a brake disc comprising a pair of friction plates spaced apart from each other to form a ventilation channel. A braking force may be applied against said plates by means of a braking lining of brake pads. The two plates are interconnected by a plurality of flow guide ribs or fins so as to define ventilation passages between the friction plates. Strips of anti-vibrating material are positioned in radial grooves formed in the mutually facing surfaces of the friction plates. These inserts consist of metal elements which damp the vibrations and have a greater expansion coefficient than that of the ferrous material with which the friction plates are made, such as lead, bronze or copper.

A similar solution is known from US2009035598.

It is known from document US2012111692 to couple passive dampers of the Squawk type with the braking device to reduce the vibrations.

From solutions U.S. Pat. No. 6,131,707, WO2016020820, WO2017153902, WO2017153873, EP0318687, WO2011058594, WO2006105131, US2006219500, U.S. Pat. No. 6,145,636, US2010122880, U.S. Pat. Nos. 6,325,185, 4,523,666, 5,004,078 it is known to provide connections between the braking band plates circumferentially distributed in non-uniform manner in order to reduce the vibrations energized by the braking action. Other solutions are known from US 2008/067018 A1 by SMITH PHILIP JOHN, US 2009/000884 A1 by LAYTON CHARLES, WO 2017/153873 A1 by the Applicant, WO 2017/153902 A1 by the Applicant, DE 20 2015 102580 U1 by FORD GLOBAL TECH LLC, U.S. Pat. No. 6,241,053 by Tahara and Aoki, U.S. Pat. No. 5,706,915 by Shimazu, JPH10318302A, JPH06129452A, DE102014222648A1, DE4323782A1.

However, in some braking situations, these distributions of the connecting elements of the plates create structural unevenness which is not always capable of modifying the natural vibration modes of the brake disc towards frequencies which allow solving the described problems.

Therefore, the need has arisen for new ventilated disc structures which concurrently offer both particularly efficient cooling performance and properties of minimizing vibrations and noise in the step of braking, and while avoiding to cause concentrated stresses in the braking band which could compromise the integrity and duration thereof.

The aforesaid known examples of ventilated discs and respective braking bands are not capable of adequately meeting all the strongly desired requirements mentioned.

The problem underlying the present invention is thus to provide a braking band and a disc for brake disc, which have such structural and functional characteristics as to satisfy the aforementioned requirements and, at the same time, to solve the drawbacks mentioned with reference to the prior art.

SUMMARY

It is the object of the present invention to provide a braking device in which the tendency to create these waves, or vibrations, and consequent squeals, is reduced.

This and other purposes and advantages are achieved by a braking band, a disc brake disc and a vehicle as described and claimed herein.

Some advantageous embodiments are also described.

An analysis of this solution has shown how the suggested solution allows a much greater braking comfort to be achieved with respect to the solutions of the prior art, therefore a reduction of the vibrations and, in particular, an absence of vibrations resulting in squeals. In particular, the suggested solutions help to separate the frequencies of the tangential mode or modes.

Moreover, the suggested solution maintains a disc cooling efficiency which is very high and even improved in some embodiments; for example, efficiency is greatly improved by virtue of the increased airflow turbulence through the gap of the braking band, turbulence which is determined by the specific shape of the ridges in the plate or plates, arranged between the connecting elements and extending in circumferential direction.

FIGURES

Further features and advantages of the device, of the brake disc and of the vehicle will be apparent from the following description of preferred embodiments thereof, by way of non-limiting examples, with reference to the accompanying figures, in which.

DESCRIPTION OF SOME PREFERRED EMBODIMENTS

Figure 1:
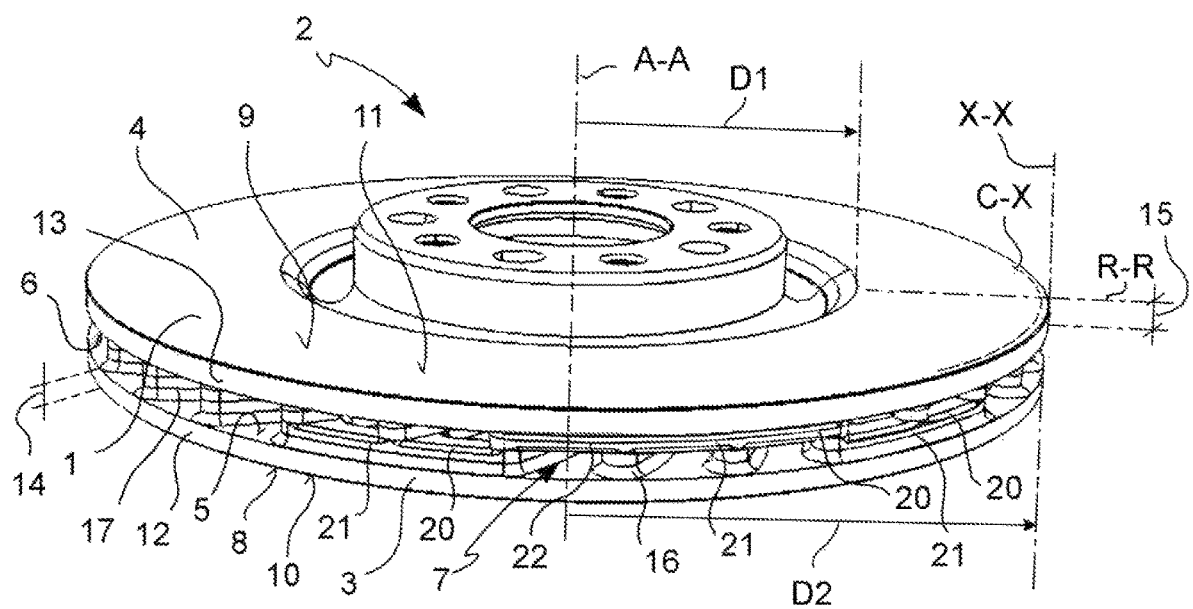
FIG. 1 shows an outer-side or wheel-side axonometric view of a brake disc in which the modules of the connecting elements of the plates are highlighted in groups joined together alternately by ridges.
Figure 2:
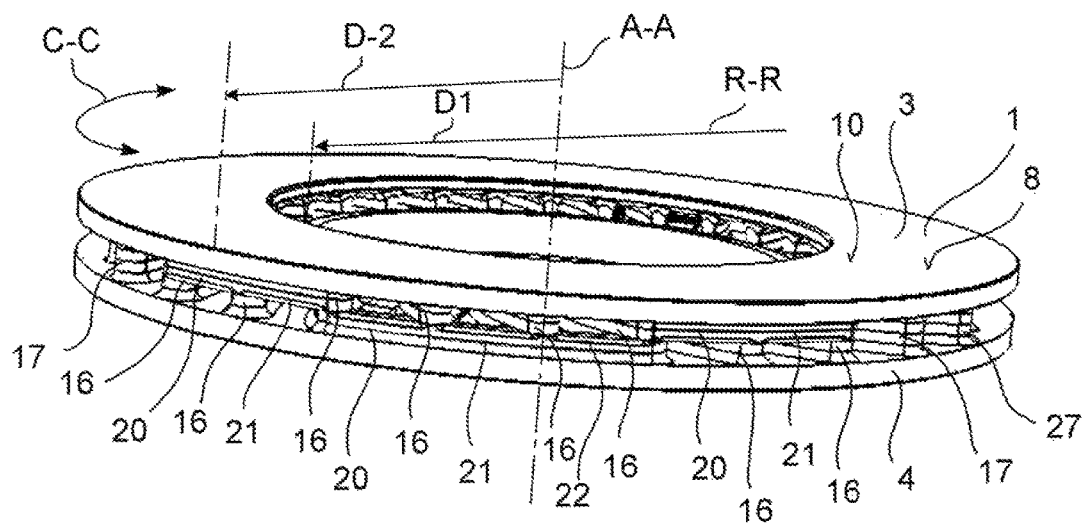
FIG. 2 shows an inner-side or vehicle-side axonometric view of the brake disc in FIG. 1.
Figure 3:
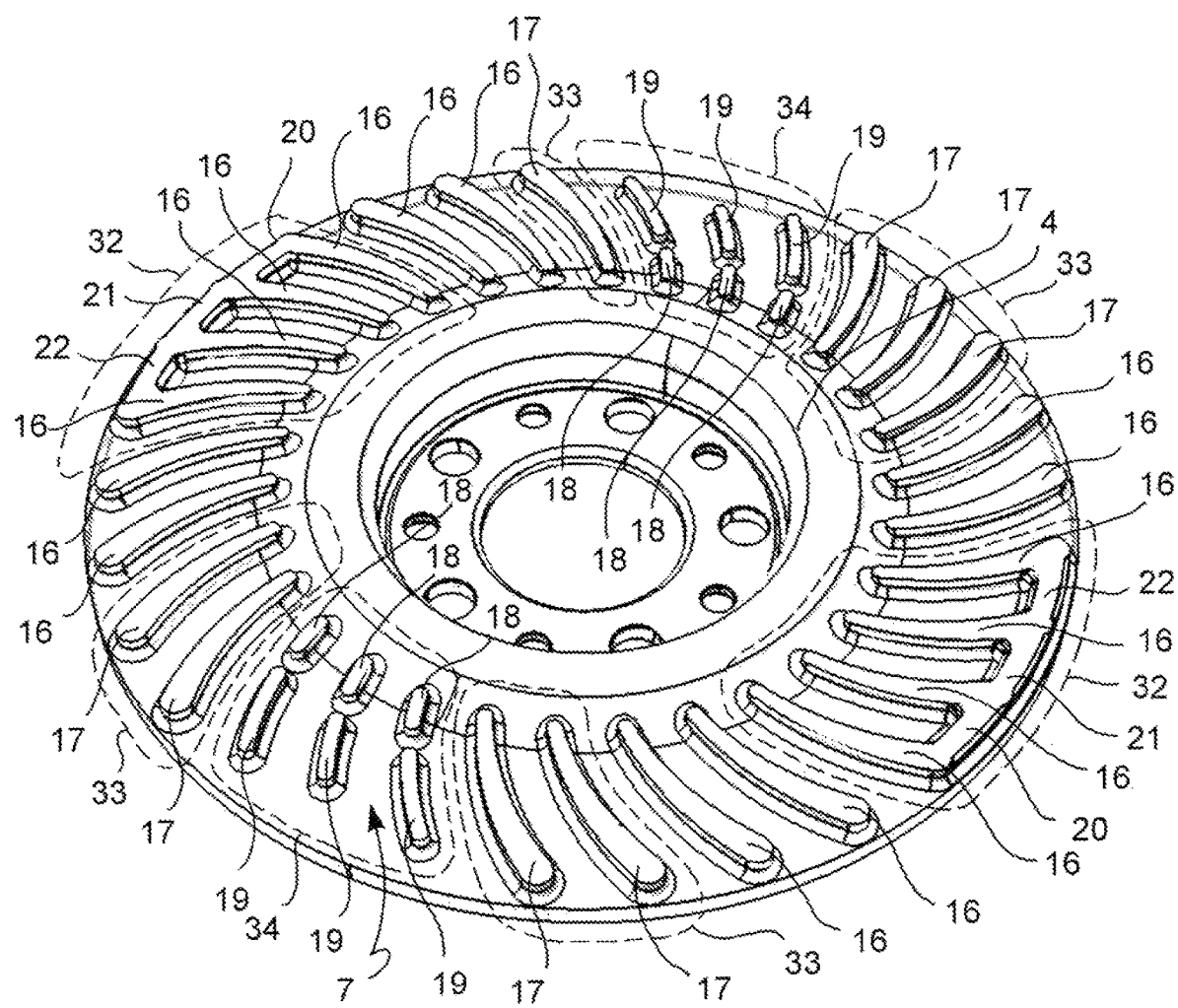
FIG. 3 shows an axonometric section view of the outer-side or wheel-side plate of the disc in FIG. 1, i.e. the plate connected to a connecting bell of the disc to a stub axle of a vehicle taken along a plane containing the radial and circumferential directions placed in the gap so as to section some ridges.
Figure 4:
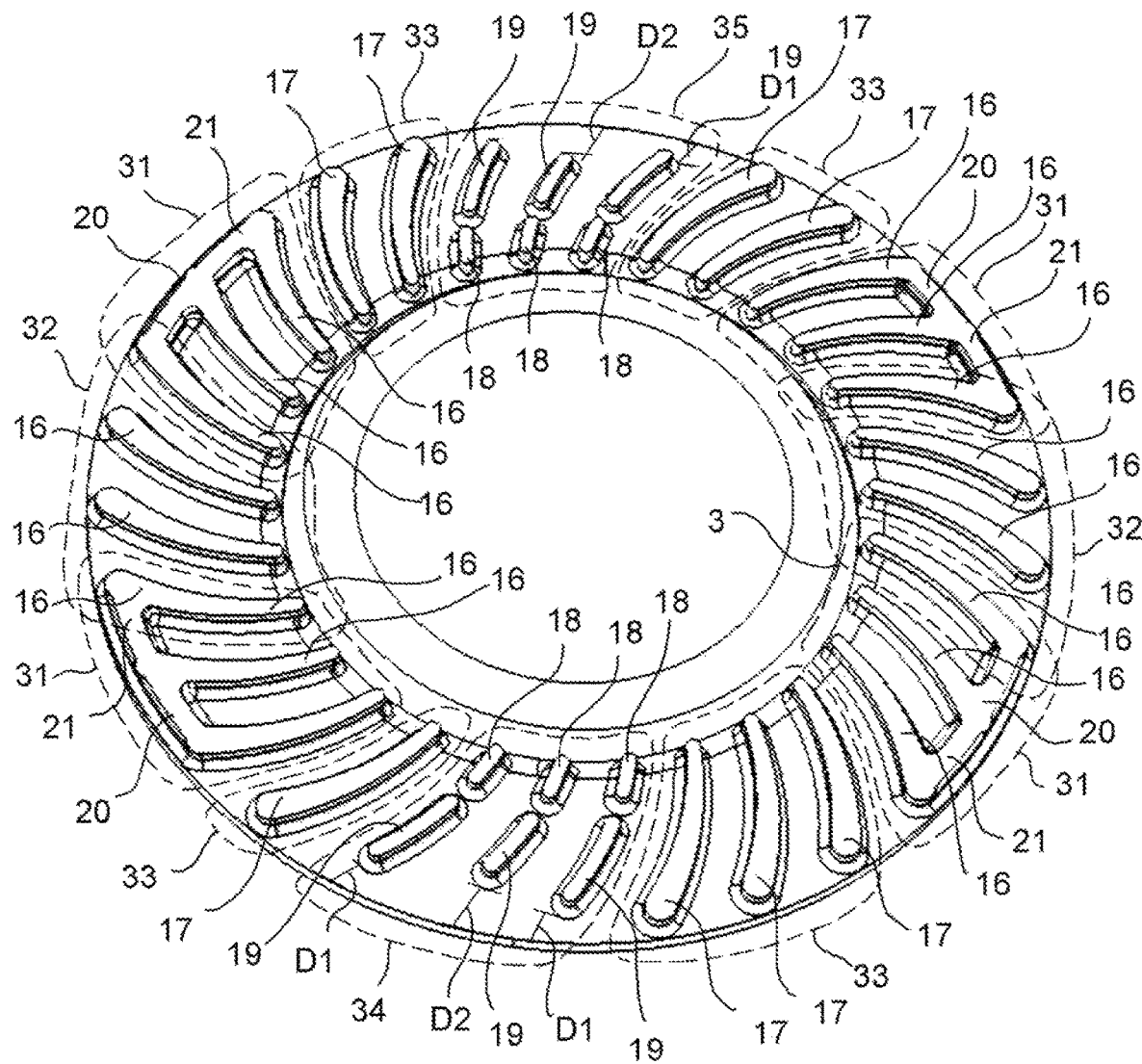
FIG. 4 shows an axonometric section view of the inner-side or vehicle-side plate of the disc in FIG. 1 taken along a plane containing the radial and circumferential directions placed in the gap so as to section some ridges.
Figure 5:
FIG. 5 shows one of the natural vibration modes of a brake disc free from the solution suggested here, or tangential mode.
Figure 6:
FIG. 6 shows one of the natural vibration modes of a brake disc free from the suggested solution here, or tangential mode.

According to a general embodiment, a braking band 1 of a disc for a disc brake 2 of ventilated type is provided.

Said braking band 1 extends between an inner diameter D1, near a rotation axis A-A of the braking band 1, and an outer diameter D2, far from said rotation axis A-A. Said rotation axis defines an axial direction X-X.

Said braking band 1 defines a radial direction R-R, which is substantially orthogonal to said axial direction X-X, and a circumferential direction C-C which is orthogonal both to said axial direction X-X and to said radial direction R-R.

Said braking band 1 comprises two plates 3, 4 facing each other.

Said plates 3, 4 comprise inner surfaces 5, 6, either directly or indirectly facing each other and delimiting a gap 7 which defines a ventilation conduit for the braking band 1.

Said plates 3, 4 comprising outer surfaces 8, 9.

Said outer surfaces 8, 9 comprise opposite flat circumferential portions, which form braking surfaces 10, 11. In other words, portions of the outer surfaces 8, 9 cooperate with brake pads housed in a brake caliper to apply a braking action when sandwiched against the braking band 1. The portion of the outer surfaces 8, 9 which is brushed or involved by the pads defines the braking surfaces 10, 11.

Said plates 3, 4 comprise a plate body 12, 13 having an extension in axial direction X-X or plate thickness 14, 15. In other words, when observed in axial direction, each plate 3, 4 shows a plate thickness 14, 15 which is given by the thickness in axial direction of the plate body 12 of the plate 3, 4.

Said plates 3, 4 are joined to each other by heat dissipation elements or connecting elements 16, 17, 18, 19.

Said connecting elements 16, 17, 18, 19 are shaped as columns and/or ribs or fins 27, which project from one plate towards the opposite plate in the shape of connecting bridges of the plates 3, 4.

Advantageously, at least one of the plates 3; 4 comprises at least one ridge 20, 21, 22 which projects from said plate 3; 4 into said gap 7 without reaching the opposite plate 4; 3, thus forming at least one localized narrowing of said gap 7 and a thickening of the plate body 12; 13, thus creating a localized increase of said plate thickness 14; 15.

Said at least one ridge 20, 21, 22 extends at least from a first connecting element 16 to an adjacent connecting element 16, thus connecting said connecting elements 16.

Said at least one ridge 20, 21, 22 extends along said circumferential direction C-C connecting at least two adjacent connecting elements 16 arranged side-by-side in circumferential direction C-C.

Said connecting elements 16 and said at least one ridge 20, 21, 22 may be grouped in modules 31, 32, 33, 34 distributed circumferentially C-C along said gap 7.

Advantageously, at least a first module 31 comprises at least three adjacent connecting elements 16 connected to one another by two ridges 20, 21, wherein said two ridges 20, 21 are aligned circumferentially C-C and wherein said two ridges 20, 21 project from a first plate 3 into said gap 7 without reaching the opposite plate 4.

At least a second module 32 comprises at least three adjacent connecting elements 16 connected to one another by two ridges 20, 21, wherein said two ridges 20, 21 are aligned circumferentially C-C and wherein said two ridges 20, 21 project from a second plate 4 into said gap 7 without reaching the opposite plate 3.

At least a third module 33 comprises at least one connecting element 17 without connection at each ridge.

According to an embodiment, at least a fourth module 34 comprises at least one connecting element 18, 19, and wherein each connecting element of said fourth module 34 remains more retracted from the band edge delimited by the outer band diameter D2 thereof than said first module 31 and/or second module.

According to an embodiment, at least a fourth module 34 comprises at least two pairs of adjacent connecting elements 18, 19, wherein each pair 18, 19 comprises two connecting elements 18, 19 aligned one after the other along a direction which extends from the inner band diameter D1 to the outer band diameter D2.

According to an embodiment, said connecting elements 18, 19 are fins.

According to an embodiment, each of said pairs of fins 27 extends along a curvilinear path.

According to an embodiment, said at least two pairs of fins 27 all have concavities having the same direction.

According to an embodiment, at least a fourth module 34 comprises at least three pairs of adjacent connecting elements 18, 19, wherein the intermediate pair of connecting elements 18, 19, i.e. arranged side-by-side on both circumferential sides of other pairs of connecting elements, extends less radially R-R than the adjacent or circumferential end pairs.

According to an embodiment, said at least a fourth module 34 consists of two fourth modules 34 arranged substantially angularly opposite in said gap 7.

According to an embodiment, said first plate 3 is the plate facing the vehicle or the inner plate.

According to an embodiment, said second plate 4 is the plate facing the wheel of the vehicle or outer plate.

According to an embodiment, said three adjacent connecting elements 16 of said first module 31 are ribs or fins 27 which extend to be continuous from a position close to the inner band diameter D1 to a position close to the outer band diameter D2.

According to an embodiment, said at least three adjacent connecting elements 16 of said second module 32 are ribs or fins 27 which extend to be continuous from a position close to the inner band diameter D1 to a position close to the outer band diameter D2.

According to an embodiment, said fins 27 of said second module 32 are four in number and connected to one another by three ridges 20, 21, 22, wherein said three ridges 20, 21, 22 are aligned circumferentially C-C and wherein said three ridges 20, 21, 22 project from a second plate 4 into said gap 7 without reaching the opposite first plate 3.

According to an embodiment, said fins 27 of said first module 31 have a cross-section, i.e. a section assessed on a plane passing through a radial direction R-R and a circumferential direction C-C, being tapered or drop-shaped, passing from the end thereof close to said outer diameter D2 to the end thereof close to said inner diameter D1.

According to an embodiment, said fins 27 of said second module 32 have a cross-section assessed on a plane passing through a radial direction R-R and a circumferential direction C-C, being tapered or drop-shaped, passing from the end thereof close to said outer diameter D2 to the end thereof close to said inner diameter D1.

According to an embodiment, said fins 27 of said first module 31 extend into said gap 7 along a curved path, all with the concavity having the same direction.

According to an embodiment, said fins 27 of said second module 32 extend into said gap 7 along a curved path, all with the concavity having the same direction.

According to an embodiment, said at least a first module 31 consists of four first modules 31.

According to an embodiment, said at least a second module 32 consists of two second modules 32.

According to an embodiment, said first module 31 is placed side-by-side to said second module 32 and said first and second side-by-side modules 31, 32 share a fin 27.

According to an embodiment, said first and second modules 31, 32 form a first-and-second-module assembly, first circumferentially comprising a first module 31, then a second module 32, and then a first module 31.

According to an embodiment, said first-and-second-module assembly is repeated twice in a braking band 1.

According to an embodiment, said two first-and-second-module assemblies are arranged in said gap 7 in substantially angularly opposite positions from each other.

According to an embodiment, said ridges 20, 21, 22 of first and/or second module 31, 32 are arranged close to said outer band diameter D2.

According to an embodiment, other ridges outside the ridges 20, 21, 22 placed close to said outer band diameter D2 are avoided between said connecting elements 16 of said first and/or second modules 31, 32.

According to an embodiment, the assembly of said ridges 20, 21, 22 extends circumferentially C-C along an annular discontinuous path, e.g. along an arc of circumference of the braking band 1, or extends circumferentially C-C over a plurality of arcs of circumference along the braking band 1, which arcs are arranged to be non-adjacent to one another.

According to an embodiment, said at least one ridge 20, 21, 22 is a single ridge which extends over a circular sector 30 and close to the outer band diameter D2.

According to an embodiment, at least a third module 33 comprises at least two connecting elements 17, both free from the connection to each ridge.

According to an embodiment, said connecting elements 17 free from ridges are fins 27 which substantially extend from a position close to said band inner diameter D1 to a position close to said outer band diameter D2.

According to an embodiment, said fins 27 are tapered or drop-shaped, passing from said outer diameter D2 to said inner diameter D1.

According to an embodiment, said fins 27 are curved and have the same mutual concavity direction.

The present invention further relates to a disc brake 2 comprising a braking band 1 according to any one of the embodiments described above.

The present invention further relates to a vehicle comprising a braking band 1 according to any one of the embodiments described above.

The person skilled in the art may make many changes and adaptations to the embodiments described above or may replace elements with others which are functionally equivalent in order to satisfy contingent needs without however departing from the scope of the appended claims.

The set of the ridges 20, 21, 22 placed close to one another forms a group of ridges 20, 21, 22 which is arranged circumferentially, thereby creating a circumferential distribution which displays circumferential discontinuities capable of creating an uneven distribution of the set of ridges, distribution adapted to avoid the presence of natural vibration modes of the braking band 1 which, if going into resonance, would create annoying noises or squeals.

LIST OF REFERENCES 1 braking band
2 disc brake disc
3 plate or first plate or vehicle-side plate or inner plate
4 plate or second plate or wheel-side plate or outer plate
5 inner surface
6 inner surface
7 gap
8 outer surface
9 outer surface
10 braking surface
11 braking surface
12 plate body
13 plate body
14 plate thickness
15 plate thickness
16 long fin connected by ridge connecting elements
17 long fin not connected by ridge connecting elements
18 inner short fin connecting elements
19 outer short fin connecting elements
20 ridge which connects first two long fins
21 ridge which connects second two fins
22 ridge which connects third pair of fins
23 line inner fins
24 line outer fins
27 fins or ribs
30 circular sector
31 first module with three fins and two ridges
32 second module with four fins and three ridges
33 third module with ridgeless fins
34 fourth module with discontinuous fins
X-X rotation axis and axial direction
D1 inner band diameter
D2 outer band diameter
R-R radial direction
C-C tangential direction

The invention claimed is:

1. A braking band of a disc for disc brake of ventilated type,
    said braking band extending between an inner band diameter, close to a rotation axis (A-A) of the braking band, and an outer band diameter, far from said rotation axis (A-A), said rotation axis defining an axial direction (X-X);
    said braking band defining a radial direction (R-R) that is orthogonal to said axial direction (X-X), and a circumferential direction (C-C) that is orthogonal both to said axial direction (X-X) and to said radial direction (R-R);
    said braking band comprising a first plate and a second plate facing each other;

said first and second plates comprising inner surfaces directly or indirectly facing each other and delimiting a gap;

said first and second plates comprising outer surfaces;

said outer surfaces comprising opposite flat circumferential portions forming braking surfaces;

said first and second plates comprising a plate body having an extension in axial direction (X-X) or plate thickness;

said first and second plates being joined to each other by heat dissipation elements or connecting elements;

said connecting elements being shaped as columns, ribs or fins projecting from one plate of said first and second plates towards an opposite plate of said first and second plates, forming connecting bridges of the first and second plates; wherein at least one plate of said first and second plates comprises at least one ridge projecting from said at least one plate into said gap without reaching the opposite plate, thus forming at least one localized narrowing of said gap and a thickening of the plate body, thus creating a localized increase of said plate thickness; and wherein said at least one ridge extends at least from a first connecting element to an adjacent connecting element, thus connecting said connecting elements; and wherein said at least one ridge extends along said circumferential direction (C-C) connecting at least two adjacent connecting elements arranged side-by-side in circumferential direction (C-C); and wherein said connecting elements and said at least one ridge are groupable in modules circumferentially distributed along said gap;

wherein at least one first module comprises at least three adjacent connecting elements connected to one another by two ridges, wherein said two ridges are circumferentially aligned and project from the first plate into said gap without reaching the second plate, and wherein at least one second module comprises at least three adjacent connecting elements connected to one another by two ridges, wherein said two ridges are circumferentially aligned and project from the second plate into said gap without reaching the first plate, and wherein at least one third module comprises at least one connecting element free of ridge connection, wherein said at least one third module comprises at least two connecting elements, both free from ridge connection, wherein said at least two connecting elements free from ridge connection are fins that extend from a position close to said inner band diameter to a position close to said outer band diameter, wherein said fins are tapered or drop-shaped, passing from said outer band diameter to said inner band diameter, and wherein said fins are curved and have the same mutual concavity direction.

2. The braking band of claim 1, wherein at least one fourth module comprises at least one connecting element, wherein each connecting element of said at least one fourth module remains more retracted from a band edge delimited by the outer band diameter than said connecting elements of said at least one first module and/or second module; or wherein at least one fourth module comprises at least two pairs of adjacent connecting elements, wherein each pair of adjacent connecting elements comprises two connecting elements aligned one after the other along a direction extending from the inner band diameter to the outer band diameter; and wherein said connecting elements are fins; and wherein each pair of fins extends along a curvilinear path; and wherein said at least two pairs of fins have concavities having a same direction.

3. The braking band of claim 1, wherein:

at least one fourth module comprises at least three pairs of adjacent connecting elements, wherein an intermediate pair of connecting elements, arranged between other pairs of connecting elements of the at least one fourth module, extends less radially (R-R) than the other pairs of connecting elements in the at least one fourth module; or wherein said at least one fourth module consists of two fourth modules arranged angularly opposite in said gap.

4. The braking band of claim 1, wherein:

said first plate is the plate facing a vehicle or inner plate; and wherein said second plate is the plate facing a wheel of the vehicle or outer plate; and wherein said three adjacent connecting elements of said at least one first module are ribs or fins that extend to be continuous from a position close to the inner band diameter to a position close to the outer band diameter.

5. The braking band of claim 1, wherein said at least three adjacent connecting elements of said at least one second module are ribs or fins that extend to be continuous from a position close to the inner band diameter to a position close to the outer band diameter; and wherein said fins of said at least one second module are four in number and connected to one another by three ridges, wherein said three ridges are circumferentially aligned and project from the second plate into said gap without reaching the first plate; and wherein said fins of said at least one first module have a cross section, assessed on a plane passing through the radial direction (R-R) and the circumferential direction, that is tapered or drop-shaped, passing from an end thereof close to said outer band diameter to the end thereof close to said inner band diameter; and wherein said fins of said at least one second module have a cross section, assessed on a plane passing through the radial direction (R-R) and the circumferential direction (C-C), that is tapered or drop-shaped, passing from the end thereof close to said outer band diameter to the end thereof close to said inner band diameter; and wherein said fins of said at least one first module extend into said gap along a curved path, all with a concavity having the same direction; and wherein said fins of said at least one second module extend into said gap along a curved path, all with the concavity having the same direction.

6. The braking band of claim 1, wherein:

said at least one first module consists of four first modules; and wherein said at least one second module consists of two second modules; and wherein said at least one first module is placed side-by-side with said at least one second module and said at least one first and second side-by-side modules share a fin; and wherein said at least one first and second modules form a first-and-second-module assembly, first circumferentially comprising a first module, then a second module, and then a first module; and wherein said first-and-second-module assembly is repeated twice in the braking band; and wherein
said two first-and-second-module assemblies are arranged in said gap in angularly opposite positions from each other.

7. The braking band of claim 1, wherein:
ridges of said at least one first and second modules are arranged close to said outer band diameter; and wherein
ridges of other modules other than in the first and second modules are spaced from the outer band; and wherein
an assembly of said ridges extends circumferentially along an annular discontinuous path, including an arc of circumference of the braking band, or extends circumferentially over a plurality of arcs of circumference along the braking band, which arcs are arranged to be non-adjacent to one another.

8. A disc for disc brake comprising a braking band according to claim 1.

9. A vehicle comprising a braking band according to claim 1.

10. A braking band of a disc for disc brake of ventilated type,
said braking band extending between an inner band diameter, close to a rotation axis (A-A) of the braking band, and an outer band diameter, far from said rotation axis (A-A), said rotation axis defining an axial direction (X-X);
said braking band defining a radial direction (R-R) that is orthogonal to said axial direction (X-X), and a circumferential direction (C-C) that is orthogonal both to said axial direction (X-X) and to said radial direction (R-R);
said braking band comprising a first plate and a second plate facing each other;
said first and second plates comprising inner surfaces directly or indirectly facing each other and delimiting a gap;
said first and second plates comprising outer surfaces;
said outer surfaces comprising opposite flat circumferential portions forming braking surfaces;
said first and second plates comprising a plate body having an extension in axial direction (X-X) or plate thickness;
said first and second plates being joined to each other by heat dissipation elements or connecting elements;
said connecting elements being shaped as columns, ribs or fins projecting from one plate of said first and second plates towards an opposite plate of said first and second plates, forming connecting bridges of the first and second plates; wherein
at least one plate of said first and second plates comprises at least one ridge projecting from said at least one plate into said gap without reaching the opposite plate, thus forming at least one localized narrowing of said gap and a thickening of the plate body, thus creating a localized increase of said plate thickness; and wherein
said at least one ridge extends at least from a first connecting element to an adjacent connecting element, thus connecting said connecting elements; and wherein
said at least one ridge extends along said circumferential direction (C-C) connecting at least two adjacent connecting elements arranged side-by-side in circumferential direction (C-C); and wherein
said connecting elements and said at least one ridge are groupable in modules circumferentially distributed along said gap;
wherein at least one first module comprises at least three adjacent connecting elements connected to one another by two ridges, wherein said two ridges are circumferentially aligned and project from the first plate into said gap without reaching the second plate, and wherein
at least one second module comprises at least three adjacent connecting elements connected to one another by two ridges, wherein said two ridges are circumferentially aligned and project from the second plate into said gap without reaching the first plate, and wherein
at least one third module comprises at least two connecting elements that do not have ridges connecting the connecting elements, and wherein
the connecting elements of the at least one third module are fins which substantially extend from a position close to the band inner diameter to a position close to the outer band diameter.

* * * * *